C. A. SCHELLENS.
METHOD OF AND MEANS FOR PREVENTING PULSATIONS IN CENTRIFUGAL COMPRESSORS.
APPLICATION FILED FEB. 2, 1917.
1,281,216.
Patented Oct. 8, 1918.
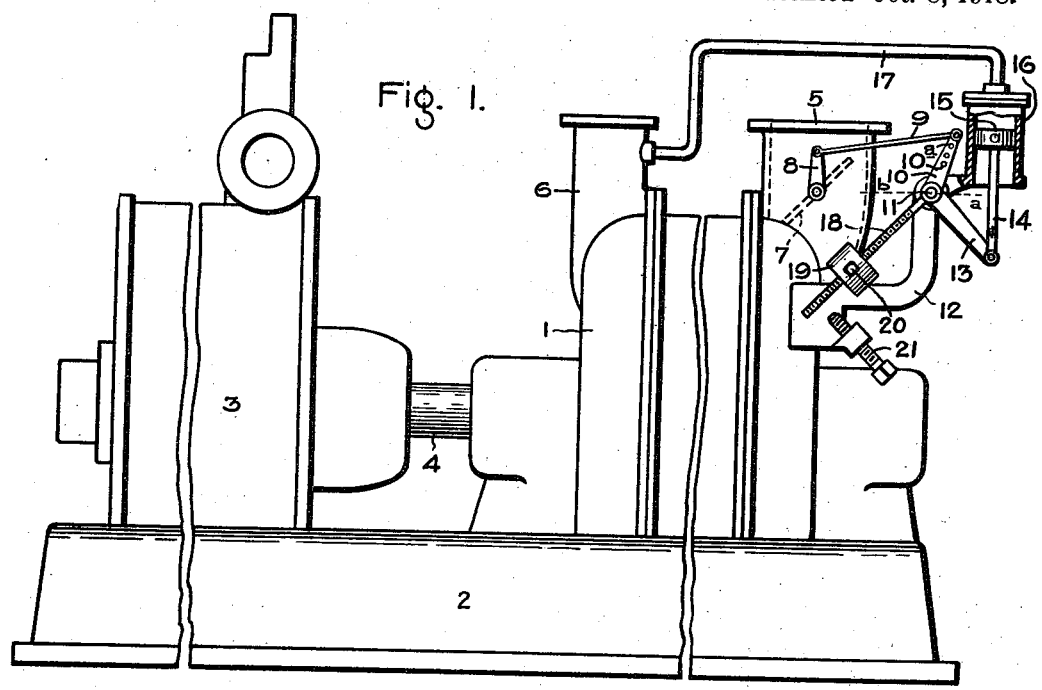
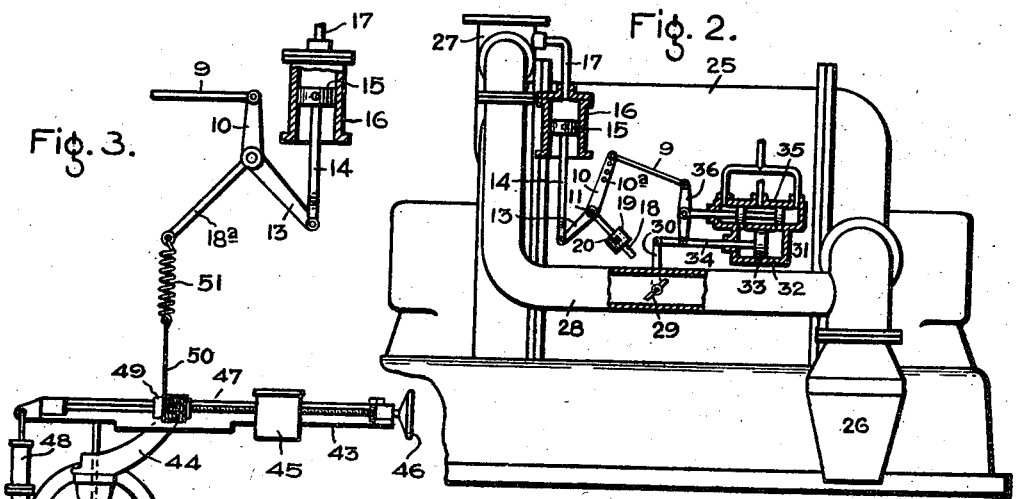
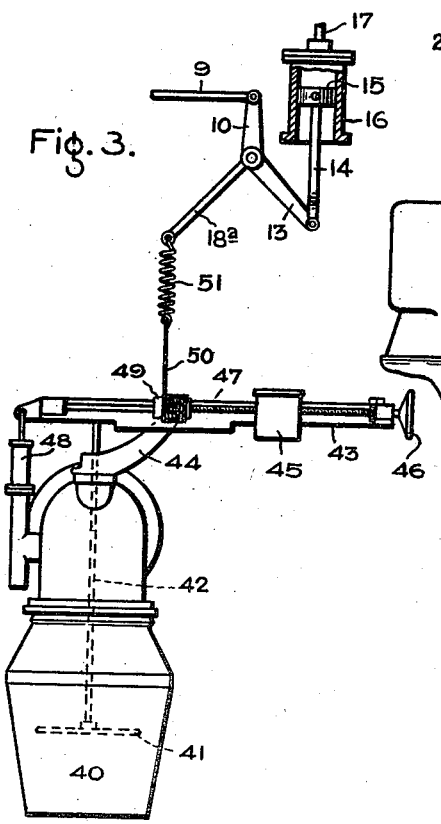
Inventor,
Christopher A. Schellens.
by
Att'y.

UNITED STATES PATENT OFFICE.

CHRISTOPHER A. SCHELLENS, OF MARBLEHEAD, MASSACHUSETTS, ASSIGNOR TO GENERAL ELECTRIC COMPANY, A CORPORATION OF NEW YORK.

METHOD OF AND MEANS FOR PREVENTING PULSATIONS IN CENTRIFUGAL COMPRESSORS.

1,281,216.     Specification of Letters Patent.     Patented Oct. 8, 1918.

Application filed February 2, 1917. Serial No. 146,112.

*To all whom it may concern:*

Be it known that I, CHRISTOPHER A. SCHELLENS, a citizen of the United States, residing at Marblehead, in the county of Essex, State of Massachusetts, have invented certain new and useful Improvements in Methods of and Means for Preventing Pulsations in Centrifugal Compressors, of which the following is a specification.

The present invention relates to centrifugal compressors, such as are used for compressing air, and has for its object to provide an improved method of and apparatus for preventing the pulsations of the column of air or other gas flowing through the machine. In the following specification the compressor is described as a machine for handling air, but it will be understood that my invention is not limited to this use.

Pulsations are found to occur under certain conditions of light load and are known to depend on the volume of air which the machine is handling and on the pressure at which it is being delivered. In other words, for every volume there is a critical pressure above which pulsations are liable to occur; and vice versa for every pressure there is a critical volume below which pulsations are liable to occur. The critical pressures and volumes in different machines vary considerably, however, and for any particular machine they can only be determined by experiment.

As already stated, the point at which pulsations occur depends on the volume and the pressure, which in turn are proportional to the speed of the machine, and the "ratio of volume to speed" or approximately "ratio of volume to square root of the pressure" is known as the "load coefficient" of a compressor. If this coefficient is relatively large, the machine will operate smoothly; but if it decreases below a certain value then pulsations will occur.

It is well known that pulsations in a compressor may be prevented, at least to a great extent, by throttling the flow of air through it, as by throttling the intake, or by wasting air from the delivery side of the machine, or by by-passing it from the delivery side to the intake. In installations where it is desirable that the machine be operated at loads where pulsations are liable to occur such valves are usually provided. Such valves may be termed generically pulsation preventing valves, and they have been actuated manually and by various automatic arrangements.

I have discovered that in order to prevent pulsations the pulsation preventing valve should be actuated in accordance with the value of the volume divided by the square root of the pressure, *i. e.*, in accordance with the load coefficient of the machine. If so actuated such valve will be operated by just the right amount and under the proper conditions to prevent pulsations occurring. As will be appreciated, the operation of a pulsating preventing valve, as the throttling of a valve in the intake or the opening of a by-pass valve is desirable only when necessary as it means, of course, a loss of energy.

Centrifugal air compressors for certain kinds of work are equipped with constant volume governors which are set to regulate the revolutions per minute of the compressor in such a manner that the quantity of air delivered per minute will be always the same. In some classes of work, such, for instance, as feeding a blast furnace, the conditions are liable to change quite frequently, so that sometimes the air can flow freely through the furnace charge and at other times it will be greatly impeded. The constant volume governor varies the speed of the compressor to meet these varying conditions, increasing or decreasing the pressure as may be necessary to force a constant volume of air through the furnace at all times. In the present application I have disclosed an apparatus for carrying out my improved method in connection with a machine of this type.

In the accompanying drawing Figure 1 is an elevation of a horizontal turbo-compressor equipped with my pulsation regulator; Fig. 2 shows a modification, and Fig. 3 shows still another modification.

Referring to Fig. 1, the centrifugal air compressor 1 is shown mounted on a bedplate 2, which also supports a turbine 3 whose shaft 4 is common to the air compressor. Air enters the compressor through the intake 5 and is delivered through the pipe 6. In the intake is a throttle valve 7, preferably of the butterfly type. On its spindle is a rock arm 8 connected by a link 9 to a rocker arm 10 on a shaft 11 journaled in a bracket 12. A lever is secured to said shaft, having one arm 13 pivotally connected to a rod 14 which is attached to a piston 15 in a cylinder 16. A pipe 17 connects the cylinder with the delivery pipe 6. The other arm 18 of the lever carries a weight 19 which can be adjusted in position along said arm and secured by a set screw 20. An adjustable stop 21 on the bracket 12 affords a rest for the lever when the throttle valve is open the widest. The rocker arm 10 and the lever arms 13 and 18 together form in substance a three-armed lever which oscillates about shaft 11. The arm 18 is graduated to represent the volumes delivered by the compressor in such a manner that the distances of the various graduations from the zero volume mark vary as the square of the volumes which are marked on them.

For centrifugal machinery at a given load coefficient, the pressure varies with the square of the speed, so that the value of "volume squared divided by pressure" is given by the value of the load coefficient. In fact, it is the square of the load coefficient. Hence there will be a definite position of the three-armed lever 13—18—10 for each load coefficient. That is to say, if both volume and pressure vary, but so as to keep the load coefficient the same, the three-armed lever will always come to balance at the same angle.

The rocker arm 10 is provided with a series of suitably spaced openings 10$^a$, at any one of which the link 9 may be connected. It will be noted that the link 9 and rocker arm 10 make an oblique angle with each other. This is for the purpose of giving the desired characteristic to the movement of valve 7. By adjusting the connection between the link 9 and the rocker arm 10 to different openings 10$^a$ the obliquity between them changes, thus changing the characteristic of the movement imparted to the valve by the turning movement of the three-armed lever.

The operator ascertains the quantity which the machine is delivering. This he does by inspecting the constant volume governor which forms a part of the regular equipment of a centrifugal air compressor for certain services. The constant volume governor is not shown in connection with Fig. 1 or with Fig. 2, but it is illustrated in a diagrammatic manner in Fig. 3. It will be understood that it is of the usual type comprising an adjustable counter weight which is set on a lever arm at a graduation representing the cubic feet of air per minute which the machine is delivering. The operator sets the weight 19 at the graduation on the arm 18 which represents the square of this volume.

There is then a moment proportionate to the pressure acting on the effective arm $a$ of the lever, and a moment proportionate to the square of the volume acting upon the other effective arm $b$ of the lever.

The operation of my device is as follows:
Let us assume that a restriction occurs in the discharge of the compressor, such as the clogging up of a blast furnace; the constant volume governor will raise the speed of the unit a sufficient amount to pump the desired constant quantity of air and the load coefficient of the machine or volume divided by the square root of pressure will decrease and may finally approach the critical value where the machine would normally pulsate. The increased pressure on the piston 15, however, tends to gradually close the inlet blast gate and this prevents such pulsations. As the load coefficient gradually decreases below the critical value, the tendency to pulsate may become marked. The inlet is, however, closed more and more and counteracts this effect.

Again let it be supposed that the constant volume governor is adjusted so that the compressor delivers less air with the pressure remaining constant. The load coefficient will again approach the critical value and the weight 19 which the operator moves toward the pivot 11 will have the effect of again throttling the blast gate thereby preventing pulsations.

It will be seen that my device affords a mathematically correct means for positioning the throttle valve. This position should be a function of the load coefficient. That is to say, for every load coefficient there should correspond one and only one position of the blast gate, and to the load coefficient at which pulsation begins should correspond the position of blast gate which will stop it irrespective of pressure or volume passing through the machine.

For example, if the machine would have pulsation with 4000 cu. ft. per minute, 2 lbs. sq. in. pressure and 3000 R. P. M. it would also have pulsation with 8000 cu. ft. per minute, 6000 R. P. M. and 8 lbs. sq. in. pressure, and if the inlet blast gate is in the correct position for preventing these pulsations in the first case above, the same position will prevent pulsations in the second case. My device assures this position being the same in both the cases above as an inspection of the lever arms of the rocker arm 13 will show.

In Fig. 2 my invention is shown as applied to a centrifugal compressor of the type wherein a by-pass is used for by-passing air from the delivery side to the intake of the compressor at light loads to prevent pulsation, this being a known method.

Referring to Fig. 2, 25 indicates a centrifugal compressor having an intake conduit 26 and a discharge conduit 27. Connecting the discharge conduit to the inlet conduit is a by-pass pipe 28 in which is arranged a butterfly valve 29 to which is connected an operating arm 30. The arm 30 is connected to a pressure operated mechanism, as is shown in Fig. 1, through a fluid actuated motor 31. The arrangement of the pressure operated mechanism of Fig. 2 is exactly the same as that of Fig. 1 and the same reference numerals have accordingly been applied to corresponding parts. 32 indicates the cylinder of the fluid actuated motor and 33 the piston, the stem 34 of which is connected to the operating arm 30. 35 indicates the usual form of pilot valve having its stem connected to the central portion of the floating lever 36, one end of which is connected to the rod 9 and the other to the stem 34. This forms a usual arrangement of follow-up device, as is well known.

In operation the valve 29 is normally closed so that no air is being by-passed. In case, however, there is a tendency of the machine to pulsate, then, as has already been described in connection with Fig. 1, the piston 15 in cylinder 16 will be moved downward thus rocking the shaft 11 and moving the pilot valve 35 to the left. This will admit fluid to the left-hand side of the cylinder 32, thus moving the piston 33 toward the right and opening the valve 29 to a greater or less extent.

Fig. 3 shows an arrangement similar to Fig. 1 but in which the weight 19 has been replaced by a spring, the tension of which is automatically adjusted when the constant volume governor weight is adjusted. 40 indicates the intake conduit of a compressor and 41 a float disk which rides on the air and has a stem 42 connected to a scale beam 43 pivoted on the end of arm 44. 45 indicates the constant volume governor weight which is adjusted along the scale beam by turning the hand wheel 46 which rotates a rod 47 having a worm thread thereon which engages a threaded part on the weight 45. 48 indicates a suitable dash pot for dampening the movements of the scale beam. As is well understood, the constant volume governing apparatus is set for different volumes by adjusting the weight along the beam. Mounted on the rod 47 to turn therewith is a drum 49 upon which is wound a rope or cord 50, one end of which is attached to one end of a spring 51. The other end of the spring 51 is fastened to an arm 18ª which corresponds to the arm 18 of Fig. 1. The other parts of the pressure operated mechanism shown are the same as those of Fig. 1 and the same reference numerals have accordingly been applied to corresponding parts. It will be understood that the rod 9 of Fig. 3 may control a pulsation-preventing valve mechanism as shown at 7 in Fig. 1, or one as shown at 29 in Fig. 2. With this arrangement whenever the constant volume governor weight is adjusted for a certain desired volume of flow the drum 49 will at the same time be turned to adjust the tension of the spring 51. It will be seen that this automatically counterbalances the pressure on the piston 15 as the constant volume governor weight 45 moves a distance proportionate to the square of the volume, and the rod 47, therefore, revolves an angular distance proportionate to the square of the volume, which makes the spring tension proportional to the square of the quantity if the motion of the lever is small compared with the motion of the cord on the drum.

The operation of the arrangement of Fig. 3 in preventing pulsations is the same as that already described in connection with Fig. 1, and will be readily apparent without further explanation.

In accordance with the provisions of the Patent Statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States is:

1. The method of preventing pulsations in a centrifugal compressor equipped with a pulsation preventing valve which consists in adjusting said valve in accordance with the value of the square of the volume passing through the compressor divided by the delivery pressure.

2. The method of preventing pulsations in a centrifugal compressor equipped with a constant volume governor and a pulsation preventing valve which consists in adjusting said valve in accordance with the square of the volume for which the governor is set divided by the delivery pressure.

3. The method of preventing pulsations in a centrifugal compressor equipped with a pulsation preventing valve which consists in operating said valve whenever the value of the square of the volume passing through the compressor divided by the delivery pressure reaches a predetermined low value.

4. The method of preventing pulsations in a centrifugal compressor equipped with a pulsation preventing valve which consists in adjusting said valve in accordance with the "load coefficient" of the machine.

5. The combination with a centrifugal compressor, of a pulsation preventing valve, a movable abutment exposed to the delivery pressure and connected to said valve, and means associated with the abutment for counterbalancing the pressure on it by an amount dependent upon the volume, whereby said valve will be positioned in accordance with the delivery pressure and the volume.

6. The combination with a centrifugal compressor, of a valve mechanism which is operated to prevent pulsations, a movable abutment, one face of which is subjected to the delivery pressure, means for counterbalancing said pressure by an amount dependent upon the volume, and means connecting said abutment to the valve mechanism.

7. The combination with a centrifugal air compressor, of a pulsation preventing valve, a movable abutment exposed to the delivery pressure and connected to said valve, and means for counterbalancing said pressure in accordance with the square of the volume delivered.

8. The combination with a centrifugal air compressor, of a throttle valve which is operated to prevent pulsations, a movable abutment exposed to the delivery pressure and connected to said valve, and means for counterbalancing said pressure in accordance with the square of the volume delivered.

9. The combination with a centrifugal compressor, of a valve which is operated to prevent pulsations, an abutment exposed to the delivery pressure and connected to said valve, and means for counterbalancing said pressure in such a manner as to assure that the motion of the abutment depends on the load coefficient of the machine.

10. The combination with a centrifugal air compressor, of a valve which is operated to prevent pulsations, a piston exposed to the delivery pressure, connections between said piston and said valve, a lever adapted to be actuated by said piston, and counterbalancing means connected to said lever and adapted to be adjusted by an amount proportionate to the square of the volume of air delivered by the machine.

11. The combination with a centrifugal air compressor, of a throttle valve which is operated to prevent pulsations, a piston exposed to the delivery pressure, a lever connected to said valve and said piston, and a counterbalancing means connected to said lever so as to oppose the pressure on the piston, said counterbalancing means being adjustable to a value porportionate to the square of the volume of air delivered by the machine.

12. The combination with a centrifugal compressor having a constant volume governor, of a valve mechanism which is operated to prevent pulsations, a movable abutment one face of which is subjected to the delivery pressure, means for counterbalancing the pressure on said face, and means for adjusting said counterbalancing means in accordance with the volume for which the constant volume governor is set.

In witness whereof, I have hereunto set my hand this 19th day of January, 1917.

CHRISTOPHER A. SCHELLENS.